United States Patent [19]

Hughes et al.

[11] Patent Number: 5,185,412
[45] Date of Patent: Feb. 9, 1993

[54] FUNCTIONALLY TERMINATED ACRYLIC ACID TELOMER

[75] Inventors: Kathleen A. Hughes; Graham Swift, both of Blue Bell, Pa.

[73] Assignee: Rohm and Haas Company, Philadelphia, Pa.

[21] Appl. No.: 724,088

[22] Filed: Jul. 1, 1991

Related U.S. Application Data

[62] Division of Ser. No. 467,073, Jan. 18, 1990.

[51] Int. Cl.⁵ .............................................. C08F 2/38
[52] U.S. Cl. ................................... 526/210; 526/317.1
[58] Field of Search ............................. 526/210, 317.1; 525/330.1

[56] References Cited

U.S. PATENT DOCUMENTS 4,771,105  9/1988  Shirai et al. ...................... 525/330.1
4,808,668  2/1989  Carioti et al. .................... 525/330.1

FOREIGN PATENT DOCUMENTS 3325738  1/1985  Fed. Rep. of Germany ... 525/330.1
0037027  3/1983  Japan ............................... 525/330.1
6172005  4/1986  Japan ............................... 525/330.1
1091521  11/1967  United Kingdom ............. 525/330.1

Primary Examiner—Joseph L. Schofer
Assistant Examiner—N. Sarofim
Attorney, Agent, or Firm—James G. Vouros

[57] ABSTRACT

A process to prepare telomers of acrylic acid with a functional terminal group through use of selected secondary alcohol chain transfer agents.

Telomers of acrylic acid containing a functional terminal group with a primary hydroxyl of a 6-12 carbon moiety.

11 Claims, No Drawings

FUNCTIONALLY TERMINATED ACRYLIC ACID TELOMER

This is a divisional of application Ser. No. 467,073, filed Jan. 18, 1990.

This invention relates to telomers of acrylic acid containing functional terminal groups and to a process to prepare them.

BACKGROUND OF THE INVENTION

Low molecular weight acrylic acid polymers provide a range of useful properties including dispersing, scale inhibition, antiprecipitation, soil dispersing and antisoil redeposition. Utility can often be improved by a) shortening the acrylic acid chain particularly to a degree of polymerization less than 100 which can be described as a telomer and b) by introducing a terminal group that contributes functionality to the telomer. Functionality could be derived from a group that confers hydrophobicity to enhance adsorption of polymer on low polarity surfaces or from a group that imparts reactivity to allow post polymerization reactions.

Use of chain transfer agents in the polymerization of acrylic acid is the usual means to control molecular weight and to introduce terminal groups. The terminal groups produce an increasingly important effect as chain length of the acrylic acid is shortened. It is with telomers that the terminal group most dramatically affects properties and performance.

Mercaptans, including alkyl, hydroxyalkyl and carboxyl containing, have been used for molecular weight control of polyacrylic acids. By acting as chain transfer agents, they also contribute an end group to the polymer chain although the selection available is limited. The mercaptan chain transfer agents, however, suffer from the serious disadvantage of imparting objectionable odor to the polymers or telomers. Because of this, the products can not be used in many applications particularly as detergent additives. Attempts to remove the odor by chasing after polymerization to remove residual mercaptan or by oxidation of residual mercaptan to a nonvolatile sulfonate have added additional processing cost and have generally not been successful. The low odor threshold of parts per billion for most mercaptans make the task of achieving odor free material and maintaining it during storage almost impossible. Poor storage stability is a result of the reversibility of the mercaptan addition reaction. Exposure of the product to elevated temperatures can lead to loss of end group and performance properties as well as increased odor.

The lower alkyl secondary alcohols, particularly isopropanol and secondary butanol, have also been employed as chain transfer agents to produce low molecular weight polyacrylic acid. These low boiling volatile alcohols, however, present processing difficulties and additional expense as their use requires pressure reactors to allow the high temperatures necessary for them to effectively control molecular weight. This is especially difficult when preparing the very low molecular weight telomers. Furthermore isopropanol or secondary butanol do not provide terminal groups that impart significant functionality; contain too few carbons for hydrophobicity and produce a tertiary hydroxyl on the terminal group with little reactivity. U.S. Pat. No. 4,774,303 does reveal the use of $C_2$ to $C_6$ secondary alcohols where the upper limit $C_6$ alcohol would contribute hydrophobicity. However, this reference teaches use of a phosphorous or phosphonic acid or salt as a necessary coreactant.

SUMMARY OF INVENTION

It is an object of the present invention to provide a process to produce telomers of acrylic acid with functional terminal groups. This is accomplished through the use of selected secondary alcohols as chain transfer agents in the polymerization of acrylic acid, chosen from the classes of:
(a) diols or polyols containing at least one secondary hydroxyl group and at least one primary hydroxyl group and
(b) secondary alcohols of 6 to 12 carbon atoms derived from alkyl, cycloalkyl or aryl moieties.

Another objective is providing an acrylic acid telomer of degree of polymerization less than 100, preferably less than 50, with terminal functional groups. The functionality is either imparting a degree of hydrophobicity for improved performance through a 6-12 carbon atom terminal group or providing increased chemical reactivity in post polymerization modifications through the presence of a primary hydroxyl moiety on the terminal group.

Other objectives are to provide a process to produce acrylic acid telomers that does not require high pressure and a process that produces telomers free of objectionable odors.

DETAILED DESCRIPTION OF THE INVENTION

The objectives are polymerizing acrylic acid to a low degree of polymerization so as to produce a telomer and selecting the terminal group to provide functionality in terms of improved properties or performance of the telomer. Employing selected secondary alcohols as chain transfer agents will accomplish this. The term telomer is defined as a polymer with a degree of polymerization averaging less than 100 which in the case of polyacrylic acid corresponds to a number average molecular weight ($M_n$) of less than 7200.

The polymerizations are run at greater than 10% telomer solids, preferably in the 20-60% solids range. Polymerization temperatures between 60°-250° C. are employed with the preferred range being 120°-200° C. The monomer is acrylic acid. A free radical generating initiator is employed in amounts of 0.05 to 10 weight percent based on weight of monomer with 0.1-5% preferred.

The polymerization is carried out with the monomer dissolved in the secondary alcohol which serves the dual role of medium and chain transfer agent.

This chain transfer agent is selected from the classes of:
(a) diols and polyols containing at least one secondary hydroxyl group and at least one primary hydroxyl group and
(b) secondary alcohols of 6-12 carbon atoms where the carbons can be present as alkyl, cycloalkyl or aryl groups.

Examples of secondary alcohols useful in this invention are 1,2-propylene glycol, dipropylene glycol, tripropylene glycol, glycerol, 2-hexanol, cyclohexanol, methyl benzyl alcohol and cyclododecanol. Where miscible, water may be used as a cosolvent in the polymerization. When water is used, in-process neutralization of the acrylic acid with an alkaline base may be useful where 0–100 equivalent percent of base is added linearly throughout the polymerization.

The free radical generating initiators useful in this invention include t-butyl peroctoate, t-butyl perbenzoate, t-butyl peracetate, hydrogen peroxide, t-butyl hydroperoxide, cumene hydroperoxide, dicumyl peroxide, ditertiary butyl peroxide, benzoyl peroxide, lauryl peroxide, methyl ethyl ketone peroxide, 2,2'-azobis(isobutyronitrile), sodium, potassium or ammonium persulfate and 2,2' azobis (cyanovaleric acid). Metal salt activators may be used with some peroxides. These include water soluble salts of cobalt, iron, copper, nickel or zinc. Levels of metal salt are 0–100 parts per million based on weight of monomer.

The process accommodates batch or continuous operation. It may be run at ambient pressure or above atmospheric pressure in a closed reactor. Monomer addition rates of 0.5–10 hours are employed. For continuous operation, residence times of greater than 30 minutes are employed. If residual monomer levels are higher than desired, a post polymerization addition of an initiator and/or a suitable monomer scavenger is possible.

The resultant product may be employed with the unreacted secondary alcohol left in solution. Alternatively, the telomer may be isolated through vacuum distillation removal of the unreacted alcohol which can be reused in subsequent polymerization. In the case where water immiscible secondary alcohols are employed, addition of water to the reacted mixture will produce a two phase, two layer system of telomer dissolved in water as one phase and the immiscible alcohol separated as the second layer. With water miscible alcohols, addition of alkali to substantially neutralize the acrylic acid telomer will also produce a two phase system whereby the alcohol can be separated from the telomer salt.

In the chain transfer process, the secondary hydroxyl group is predominately the chain transfer site. Primary or tertiary alcohols are an order of magnitude less efficient and do not participate to any significant extent in the transfer reaction. The telomer produced essentially has the reacted chain transfer agent as the terminal group to provide functionality. In this process, the secondary hydroxyl is converted to a tertiary hydroxyl.

When the chain transfer agent has one or more primary hydroxyls in addition to the secondary hydroxyl, the terminal group on the telomer will have a primary hydroxyl as the functionality. It provides a site that readily participates in post polymerization reactions. Reactions with carboxylic acids or isocyanates, for example, can permit further modification of the properties and performance of the acrylic acid telomer. An especially useful means of utilizing the terminal primary hydroxyl group to modify the telomer is to react it with a carboxyl group of a neighboring acrylic acid telomer molecule. This intermolecular esterification results in increasing molecular weight and can provide additional performance dimensions. Example 13 illustrates such a post polymerization reaction.

Where a 6–12 carbon secondary alcohol is the chain transfer agent, the resultant acrylic acid telomer has a 6–12 carbon moiety as the functional terminal group. This group imparts a degree of hydrophobic character which provides improved performance. Hydrophobic terminated acrylic acid telomers are more efficient dispersing agents for clays and more effective scale inhibitors in cooling towers, for example. This effect is believed to be attributable to the greater surface activity and stronger adsorption on surfaces like clays and insoluble salts than telomers without hydrophobe termination.

In order to illustrate the nature of this invention and the manner of practicing it, the following examples are presented.

EXAMPLE 1

To a two liter 4 neck flash equipped with a mechanical stirrer, a reflux condenser and inlet for gradual addition of monomer, was added 942 grams of propylene glycol. The propylene glycol was heated to 160° C. A monomer-initiator cofeed of 216 grams of glacial acrylic acid and 4.36 grams of ditertiary butyl peroxide was prepared. The cofeed was added linearly over two hours. Temperature was maintained at 160°+/−2° C.

In order to isolate the telomer as a sodium salt in aqueous solution, 255 grams of deionized water and 216 grams of 50% sodium hydroxide were added to the stirred polymerized reaction solution. The resulting two layers were separated; the bottom aqueous layer contained the teolomer salt; the top layer comprised of unreacted chain transfer alcohol and water was assayed for water content and reused in a subsequent polymerization. The telomer solution had a solids content of 21% and a viscosity of 290 centipoise. Gel permeation chromatography indicated a molecular weight number average ($M_n$) of 2820 which corresponds to a degree of polymerization (DP) of about 38.

EXAMPLE 2

The procedure of Example 1 was repeated except 733 grams of methyl benzyl alcohol was added in place of the propylene glycol. The telomer had an $M_n$ of 764 and DP of about 9.

EXAMPLE 3

The procedure of Example 1 was repeated except that the chain transfer agent was 700 grams of methyl benzyl alcohol and the initiator was 4.32 grams of tertiary butyl peroctoate in 33 grams of methyl benzyl alcohol and the reaction temperature was 100°+/−2° C. Analysis indicated $M_n=1800$, DP about 23.

EXAMPLE 4

The procedure of Example 1 was repeated except that the chain transfer agent was 244 grams of methyl benzyl alcohol, the monomer-initiator cofeed was 288 grams of glacial acrylic acid with 5.26 grams of di-tert-butyl peroxide and the reaction was run at reflux and 288 grams of 50% sodium hydroxide was added during the isolation. $M_n=3730$, DP about 50.

EXAMPLE 5

The procedure of Example 1 was repeated except the chain transfer agent was 365.4 grams of methyl benzyl alcohol, the monomer-initiator cofeed was 216.2 grams of glacial acrylic acid and 4.35 grams of di-tert-butyl peroxide and the reaction was run at 100°+/−2° C. $M_n$ was 1000 for a DP of about 12.

EXAMPLE 6

The procedure of Example 1 was repeated except the chain transfer agent was 600.9 grams of cyclohexanol and the reaction temperature was 100°+/12° C. $M_n=1220$, DP of about 15.

EXAMPLE 7

Example 6 is repeated except that the reaction temperature was 160°+/−2° C.. $M_n=1220$, DP of abaout 15.

EXAMPLE 8

The procedure of Example 1 was repeated except 1608.4 grams of dipropylene glycol was added in place of the propylene glycol, $M_n=1160$, DP of about 14.

EXAMPLE 9

The procedure of Example 1 was repeated except 700.3 grams of dipropylene glycol was added in place of propylene glycol, the initiator solution was 4.32 of tert-butyl peroctoate and the reaction temperature was 100°+/12° C. $M_n=5140$, DP of about 70.

EXAMPLE 10

The procedure of Example 1 was repeated except the chain transfer agent was 1105 grams of glycerol. $M_n=5760$, DP of about 28.

EXAMPLE 11

The procedure of Example 1 was repeated with 1422 grams of tripropylene glycol added in place of the propylene glycol. $M_n=747$, DP of about 7.

EXAMPLE 12

The procedure of Example 1 was repeated except the chain transfer agent was 474.4 grams of tripropylene glycol, the monomer-initiator cofeed was 2.89 grams of di-tert-butyl peroxide and 144 grams of acrylic acid, and 144 grams of 50% hydroxide was added in the isolation. $M_n=1010$, DP of about 10.

EXAMPLE 13

The telomer of Example 1 was isolated by an alternative procedure. The polymerized solution was steam distilled to remove the unreacted propylene glycol leaving the primary hydroxyl terminated acrylic acid telomer. The telomer mixture was made to undergo esterification by heating to remove water and then to react the hydroxyl group with a carboxylic acid group on a neighboring telomer molecule. The higher molecular weight product was a more effective sequestrant, anti-precipitant and detergent additive than the original low molecular weight telomer.

We claim:

1. A polyacrylic acid telomer or salt thereof with a degree of polymerization of less than 100 with a functional terminal group derived from a secondary alcohol chain transfer agent selected from the group consisting of:
    (a) diols and polyols containing at least one secondary hydroxyl group and at least one primary hydroxyl group; and
    (b) secondary alcohols of 6 to 12 carbon atoms where the carbons are present as alkyl, cycloalkyl or aryl groups.

2. A polyacrylic acid telomer or salt thereof with a degree of polymerization of less than 100 with a functional terminal group derived from a secondary alcohol chain transfer agent selected from the group consisting of diols and polyols containing at least one secondary hydroxyl group and at least one primary hydroxyl group.

3. The polyacrylic acid telomer of claim 2 wherein the secondary alcohol chain transfer agent is selected from the group consisting of 1,2-propylene glycol, dipropylene glycol, tripropylene glycol, and glycerol.

4. The polyacrylic acid telomer of claim 2 wherein the secondary alcohol chain transfer agent is 1,2-propylene glycol.

5. The polyacrylic acid telomer of claim 2 wherein the secondary alcohol chain transfer agent is dipropylene glycol.

6. A polyacrylic acid telomer or salt thereof with a degree of polymerization of less than 100 with a functional terminal group derived from a secondary alcohol chain transfer agent selected from the group consisting of secondary alcohols of 6 to 12 carbon atoms where the carbons are present as alkyl, cycloalkyl or aryl groups.

7. The polyacrylic acid telomer of claim 6 wherein the secondary alcohol chain transfer agent is selected from the group consisting of 2-hexanol, cyclohexanol, methyl benzyl alcohol and cyclododecanol.

8. The polyacrylic acid telomer of claim 2 wherein the secondary alcohol chain transfer agent is methyl benzyl alcohol.

9. The polyacrylic acid telomer of claim 1 wherein the degree of polymerization is less than 50.

10. The polyacrylic acid telomer of claim 2 wherein the degree of polymerization is less than 50.

11. The polyacrylic acid telomer of claim 6 wherein the degree of polymerization is less than 50.

* * * * *